(12) United States Patent
Borovik et al.

(10) Patent No.: US 7,875,318 B2
(45) Date of Patent: Jan. 25, 2011

(54) METHOD OF APPLYING AN ANTI-CORROSION AND/OR ADHESION PROMOTING COATING TO A METAL AND RESULTING COATED METAL

(75) Inventors: Alexander S. Borovik, White Plains, NY (US); Shiu-Chin H. Su, Croton-on-Hudson, NY (US)

(73) Assignee: Momentive Performance Materials Inc., Albany, NY (US)

( * ) Notice: Subject to any disclaimer, the term of this patent is extended or adjusted under 35 U.S.C. 154(b) by 428 days.

(21) Appl. No.: 11/789,398

(22) Filed: Apr. 24, 2007

(65) Prior Publication Data

US 2008/0268162 A1  Oct. 30, 2008

(51) Int. Cl.
B05D 1/38 (2006.01)
(52) U.S. Cl. ...................................... 427/387; 427/409
(58) Field of Classification Search ........................ None
See application file for complete search history.

(56) References Cited

U.S. PATENT DOCUMENTS

| | | | |
|---|---|---|---|
| 5,206,285 A | 4/1993 | Castellucci | |
| 5,371,262 A | 12/1994 | Arkles | |
| 5,587,502 A | 12/1996 | Moren et al. | |
| 5,672,451 A * | 9/1997 | Tam et al. | 430/41 |
| 5,693,371 A | 12/1997 | Rodzewich et al. | |
| 5,709,957 A | 1/1998 | Chiang et al. | |
| 5,711,996 A | 1/1998 | Claffey | |
| 5,728,203 A | 3/1998 | Vorse et al. | |
| 5,750,197 A | 5/1998 | van Ooij et al. | |
| 5,759,629 A | 6/1998 | van Ooij et al. | |
| 5,796,117 A | 8/1998 | Larson et al. | |
| 5,801,217 A | 9/1998 | Rodzewich et al. | |
| 5,866,651 A | 2/1999 | Moren et al. | |
| 6,001,945 A | 12/1999 | Decker et al. | |
| 6,071,566 A | 6/2000 | Brown et al. | |
| 6,106,901 A | 8/2000 | Song et al. | |
| 6,121,404 A | 9/2000 | Liles | |
| 6,132,589 A | 10/2000 | Ameen et al. | |
| 6,132,808 A | 10/2000 | Brown et al. | |
| 6,262,216 B1 * | 7/2001 | McGall | 528/10 |
| 6,361,592 B1 | 3/2002 | Song et al. | |
| 6,369,139 B1 | 4/2002 | Osterholtz et al. | |
| 6,461,682 B1 | 10/2002 | Crotty et al. | |
| 2006/0228470 A1 | 10/2006 | He et al. | |

FOREIGN PATENT DOCUMENTS

| | | |
|---|---|---|
| EP | 0637902 | 2/1995 |
| EP | 1900846 | 3/2008 |
| GB | 1593217 * | 7/1981 |
| WO | WO 2007/004449 | 1/2007 |
| WO | WO 2008/133907 | 11/2008 |

OTHER PUBLICATIONS

Child, T et al., "Application of Silane Technology to Prevent Corrosion of Metals and Improve Paint Adhesion", *Transactions of the Institute of Metal Finishing*, (1999) vol. 77:2, pp. 64-70.

* cited by examiner

*Primary Examiner*—Erma Cameron
(74) *Attorney, Agent, or Firm*—Dominick G. Vicari; Joseph S. Ostroff

(57) ABSTRACT

A method of coating at least a portion of the exposed surface of a metal comprises:
  a) applying to said surface a curable coating composition comprising an aqueous solution of at least one partially or substantially completely hydrolyzed, and optionally partially condensed, silane possessing one or more hydroxyl groups and, optionally, one or more organonitrogen groups, said hydroxyl group(s) and optional organonitrogen group(s) being bonded to different carbon atoms of a bridging group linking such group(s) to the silicon atom of the partially or substantially completely hydrolyzed and optionally partially condensed silane; and,
  b) curing the curable coating composition on the surface of the metal to provide an anti-corrosion and/or adhesion promoting coating thereon.

20 Claims, No Drawings

METHOD OF APPLYING AN ANTI-CORROSION AND/OR ADHESION PROMOTING COATING TO A METAL AND RESULTING COATED METAL

BACKGROUND OF THE INVENTION

1. Field of the Invention

This invention relates to methods of applying coatings exhibiting anti-corrosion and/or adhesion-promoting properties to metal surfaces and to metals possessing such coatings on at least a portion of a surface thereof.

2. Description of the Prior Art

Most metals are susceptible to some form of corrosion, in particular atmospheric corrosion, resulting in the formation of various types of rust. Such corrosion may significantly affect the quality of a metal. Although superficial corrosion can usually be removed from metal surfaces, processes for its removal tend to be time consuming, costly and may have a negative impact on the integrity of the metal. Where coatings are applied to metal surfaces, corrosion of the metal may result in inadequate or ineffective adhesion between the coating and the metal surface. A reduction in adhesion between a coating and metal surface to which the coating has been applied may likewise lead to corrosion of the metal.

Metals of many kinds, including metal alloys, metal laminates, metal composites, and, the like, are widely used in manufacturing and construction. Certain types of metal, particularly ferrous metals such as iron and steel, often develop rust during storage and shipment. Rust (also called "storage stain") is typically caused by moisture which condenses on the surface of the metal there to react with the metal or metal coating on the metal. Rust is aesthetically unappealing and often impairs the ability of the metal to directly undergo subsequent processing operations. Thus, prior to conducting any subsequent processing operations, rust often needs to be removed from the surface of metal and the metal surface treated to prevent rust from reforming. Various methods are currently employed to not only prevent the formation of rust during shipment and storage, but also to prevent the formation of rust after the metal has undergone subsequent processing operations.

It is well known that prevention of rust on metals during their storage, shipping and use can be achieved by applying to their surfaces a thin film such as one of chromate. While chromate coatings do provide resistance to the formation of rust, chromium is highly toxic and environmentally undesirable. Furthermore, a chromium layer may do nothing to improve the adhesion of any subsequent layer applied thereto.

Therefore, a need exists for a method for coating metal that does not utilize chromium while still providing desirable anti-corrosion and adhesion properties.

BRIEF DESCRIPTION OF THE INVENTION

In accordance with the invention, a method is provided for coating at least a portion of an exposed surface of a metal which comprises:

a) applying to said surface a curable coating composition comprising an aqueous solution of at least one partially or substantially completely hydrolyzed, and optionally partially condensed, silane possessing one or more hydroxyl groups and, optionally, one or more organonitrogen groups, said hydroxyl group(s) and optional organonitrogen group(s) being bonded to different carbon atoms of a bridging group linking such group(s) to the silicon atom of the partially or substantially completely hydrolyzed and optionally partially condensed silane; and, b) curing the curable coating composition on the surface of the metal to provide an anti-corrosion and/or adhesion promoting coating thereon.

The hydroxyl group(s) and optional organonitrogen group(s) remain present in the cured coating as they are unaffected by the hydrolysis which provides the partially or substantially completely hydrolyzed silane and the subsequent curing of the silane which provides the anti-corrosion and/or adhesion promoting coating. The cured coating is a polysiloxane possessing Si—O—Si bonds. In addition, when the substrate metal contains hydroxyl groups, these can also react with the silanol groups of the partially or substantially completely hydrolyzed and optionally partially condensed silane to provide Si—O-metal bonds which function as anchoring sites for the cured coating.

The hydroxyl group(s) and optional organonitrogen group(s), where present, of the silane component(s) of the aqueous coating composition herein increase its solubility and the solubility of its hydrolysis and condensation products therein owing, possibly, to the greater affinity of these polar groups for hydrogen bonding with water. This greater solubility, whatever its cause(s), in turn reduces or eliminates precipitation of condensation products thus increasing the storage stability (or shelf-life) of aqueous solutions of the silane(s), a very important practical consideration for their successful use in the coating method of the invention. In addition, the hydroxyl groups can react with mutually reactive groups possessed by some kinds of further coatings that may optionally be applied thereto. Thus, covalent bonding or other interaction that takes place between the hydroxyl-containing hydrolyzable silane and an optional additional coating during the application and drying of the optional additional coating can improve the adhesion of the latter to the underlying silane-derived coating.

The term "curing" as used herein refers to the progressive chemical change by which partially and/or substantially completely hydrolyzed and optionally partially condensed silane component(s) of a curable coating composition in accordance with this invention pass from the solution stage of the freshly applied coating composition to the gelation stage resulting in an insoluble, hardened coating layer. This chemical change, brought about by the condensation (or as it may also be referred to, polycondensation) of

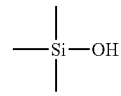

groups with themselves to form the

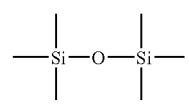

linkages characteristic of organopolysiloxanes, involves the removal of water from the coating composition. The term "coating" herein includes partial, or incomplete, curing and substantially complete curing. Condensation resulting in curing will take place under ambient temperature conditions and can be accelerated by the application of heat and/or vacuum.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof

DETAILED DESCRIPTION OF THE INVENTION

The partially or substantially completely hydrolyzed silane employed in the method of the invention is obtained by subjecting a hydroxyl-containing, and optionally organonitrogen group-containing, hydrolyzable silane to partial or substantially complete hydrolysis.

In one embodiment, the hydroxyl-containing hydrolyzable silane corresponds to the general Formula (1):

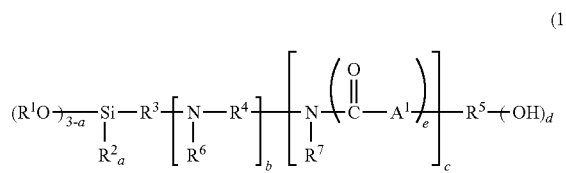

wherein:
  each occurrence of $R^1$ and $R^2$ is independently a monovalent hydrocarbyl group, e.g., an alkyl, alkenyl, arenyl, aryl or aralkyl group or acyl group of up to 20 carbon atoms, optionally containing one or more etheric oxygen atoms;
  each occurrence of $R^3$ and $R^4$ is independently a divalent hydrocarbylene group, e.g., an alkylene, alkenylene, arenylene, arylene or aralkylene group of up to 12 carbon atoms;
  each occurrence of $R^5$ is independently a divalent or polyvalent hydrocarbylene group, e.g., an alkylene, alkenylene, arenylene, arylene or aralkylene group of up to 12 carbon atoms, provided, when b is 0, c is 0 and d is 1, then $R^5$ can be a chemical bond between $R^3$ and the —OH group;
  each occurrence of $R^6$ is independently hydrogen, a monovalent hydrocarbyl group, e.g., an alkyl, alkenyl, arenyl, aryl or aralkyl group of up to 8 carbon atoms, an —$R^3SiR^2_a(OR^1)_{3-a}$ group, a —$C(=O)A^1R^5(OH)_d$ group or an —$R^5(OH)_d$ group;
  each occurrence of $R^7$ is independently hydrogen, a monovalent hydrocarbyl group, e.g., an alkyl, alkenyl, arenyl, aryl, and aralkyl group of up to 8 carbon atoms, an —$R^3SiR^2_a(OR^1)_{3-a}$ group or an —$R^8(OH)_f$ group;
  each occurrence of $R^8$ is independently a divalent or polyvalent hydrocarbylene group, e.g., an alkylene, alkenylene, arenylene, arylene or aralkylene group of up to 12 carbon atoms;
  each occurrence of $A^1$ is independently divalent oxygen (—O—) or nitrogen of the structure —$NR^9$— in which wherein $R^9$ is hydrogen, a monovalent hydrocarbyl group, e.g., an alkyl, alkenyl, arenyl, aryl or aralkyl group of up to 8 carbon atoms, an —$R^3SiR^2_a(OR^1)_{3-a}$ group or an —$R^8(OH)_f$ group; and,
  each occurrence of the subscripts a, b, c, d, e and f is independently an integer wherein a is 0 to 2; b is 0 to 20; c is 0 or 1; d is 1 to 4; e is 0 or 1; and, f is 1 to 4.

As used herein in connection with the hydroxyl-containing hydrolyzable silane of Formula (1), "alkyl" includes straight, branched and cyclic alkyl groups; "alkenyl" includes any straight, branched, or cyclic alkenyl group containing one or more carbon-carbon double bonds where a site of substitution, if any, can be either at a carbon-carbon double bond or elsewhere in the group; "aryl" includes any aromatic hydrocarbon from which one hydrogen atom has been removed; "aralkyl" includes any of the aforementioned alkyl groups in which one or more hydrogen atoms have been substituted by the same number of like and/or different aryl (as defined herein) substituents; "arenyl" includes any of the aforementioned aryl groups in which one or more hydrogen atoms have been substituted by the same number of like and/or different alkyl (as defined herein) substituents; "alkylene" includes straight, branched and cyclic alkylene groups; "alkenylene" includes any straight, branched or cyclic alkenylene group containing one or more carbon-carbon double bonds where a site of substitution, if any, can be either at a carbon-carbon double bond or elsewhere in the group; "arylene" includes any aromatic hydrocarbon from which two or more hydrogen atoms have been removed; "aralkylene" includes any of the aforementioned alkylene groups in which one or more hydrogen atoms have been substituted by the same number of like and/or different aryl (as defined herein) substituents; "arenylene" includes any of the aforementioned arylene groups in which one or more hydrogen atoms have been substituted by the same number of like and/or different alkyl (as defined herein) substituents; "hydrocarbyl" includes any hydrocarbon in which one hydrogen atom has been removed to form a monovalent group; and, "hydrocarbylene" includes any hydrocarbon in which at least two hydrogen atoms have been removed to form a divalent or a polyvalent group.

Specific examples of alkyl include methyl, ethyl, propyl and isobutyl. Specific examples of alkenyl include vinyl, propenyl, allyl, methallyl, ethylidenyl norbornane, ethylidene norbornyl, ethylidenyl norbornene and ethylidene norbornenyl. Specific examples of aryl include phenyl and naphthalenyl. Specific examples of aralkyl include benzyl and phenethyl. Specific examples of arenyl include tolyl and xylyl. Specific examples of alkylene include methylene, ethylene, propylene and isobutylene. Specific examples of alkenylene include ethenylene, propenylene, methallylene, ethylidenylene norbornane, ethylidene norbornylene, ethylidenylene norbornene and ethylidene norbornenylene. Specific examples of aryl include phenylene and naphthalenylene. Specific examples of aralkylene include phenethylene and phenylmethylene. Specific examples of arenylene include tolylene and xylylene.

As used herein in connection with the hydroxyl-containing hydrolyzable silanes of Formula (1), "cyclic alkyl", and "cyclic alkenyl" also include bicyclic, tricyclic and higher cyclic structures as well as the aforementioned cyclic structures further substituted with alkyl, and/or alkenyl groups. Representative examples of these structures include norbornyl, norbornenyl, ethylnorbornyl, ethylnorbornenyl, ethylcyclohexyl, ethylcyclohexenyl, cyclohexylcyclohexyl and cyclododecatrienyl.

Hydrolysis occurs when water reacts with the hydrolyzable silyl group, e.g.,

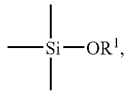

and replaces the hydrolyzable moiety in the group with HO— to provide a silanol,

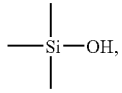

group. Condensation occurs when a silyloxy group,

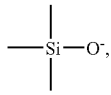

replaces an alkoxy or hydroxy group to provide a siloxane,

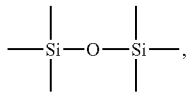

group. The extent of hydrolysis may be calculated using Equation (I):

$$\text{Percent hydrolysis} = [100\%][1-(A/(A+B+C))] \quad (I)$$

wherein A is the number of hydrolyzable silyl groups; B is the number of silanol groups; and C is the number silyloxy groups bonded to a silicon atom.

The numerical values for A and B can be determined by $^{29}$Si Nuclear Magnetic Resonance (NMR) which involves obtaining a spectra of the hydroxyl-containing hydrolyzable silane and interpreting the data. In accordance with this procedure, the hydroxyl-containing hydrolyzable silane or an aqueous solution thereof is placed in a 10 mm NMR tube with a capillary tube containing acetone-$d_6$ added for locking purposes. The chemical shifts are externally referenced to tetramethylsilane for $^{29}$Si NMR. An inverse gated decoupling pulse sequence is used with a pulse width of 45-degrees for $^{29}$Si atom. A delay of 360 seconds is used between scans. The acquisition time of 1.4 seconds for $^{29}$Si NMR operating at a field strength of 7.05 T. 59.6 MHz for $^{29}$Si atom correlates to a sweep width of 11627 Hz and a size of 32K. The spectral data are processed using a line band of 2 Hz. Data for $^{29}$Si NMR spectra are collected for 48 hours. The hydrolysis of the silane is monitored by observing an increase in the chemical shift by approximately 1 ppm as an alkoxy group, e.g., a methoxy group, is replaced by a hydroxyl group to result in a silanol group. Condensation of the hydrolyzed silane is observed as a decrease in the chemical shift of approximately 10 ppm for every alkoxy group replaced with a silyloxy group

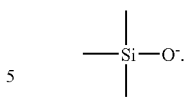

As an alkoxy group is increased in size, e.g., from methoxy to ethoxy, the chemical shift difference increases and can be determined experimentally.

The hydroxyl-containing hydrolyzable silane is partially hydrolyzed when less than an equivalent amount of water reacts with the hydrolyzable silyl group. The silane is considered partially hydrolyzed when the percent hydrolysis is in the range of 1 to 94 percent. The hydroxyl-containing hydrolyzable silane is considered substantially fully hydrolyzed when the percent hydrolysis is in the range of 95 to 100 percent. The partially hydrolyzed hydroxyl-containing hydrolyzable silane has better stability in an aqueous solution because the R$^1$O—Si group terminates the polymerization reaction of the silanol condensation and maintains a lower average molecular weight oligomeric composition that is derived from the hydroxyl-containing hydrolyzable silane. The lower molecular weight oligomeric composition adsorbs more uniformly onto the metal substrate resulting in better adhesion.

In another embodiment, the hydroxyl-containing hydrolyzable silane and/or aqueous solution of hydroxyl-containing organosilicon composition can comprise oligomers such as oligomers derived from the hydroxyl-containing hydrolyzable silane of Formula (1). Some oligomers result from intermolecular transesterification of the hydroxyl group of one hydroxyl-containing hydrolyzable silane with the silyl ester group of a different hydroxyl-containing hydrolyzable silane. Other oligomers result from the hydrolysis of the hydroxyl-containing hydrolyzable silane and the inter-molecular condensation of the hydrolysis products (silanols) of one hydroxyl-containing hydrolyzable silane with the silanol of a different hydroxyl-containing hydrolyzable silane such as are described herein. In one embodiment, hydroxyl-containing hydrolyzable silane and/or aqueous solution of hydroxyl-containing organosilicon composition include oligomers derived by the transesterification of the hydroxyl-containing hydrolyzable silane of Formula (1), monomers of Formula (1) and oligomers derived from the partial or complete hydrolysis and condensation of the hydroxyl-containing hydrolyzable silane of Formula (1).

Oligomers derived from a hydroxyl-containing hydrolyzable silane of Formula (1) can be prepared by transesterifying the silane at sub-ambient, ambient or elevated temperature, under reduced, ambient or elevated pressure and in the absence or presence of solvent and/or catalyst. In one embodiment, the transesterification reaction can be carried out at a temperature of from 0 to 150° C., preferably from 25 to 100° C. and more preferably from 60 to 80° C., at a pressure of from 0.1 to 2000 mm Hg absolute. In another embodiment, the temperature can range from 30 to 90° C. while maintaining a pressure of from 1 to 80 mm Hg absolute. As lower boiling R$^1$O—H compound(s), e.g., monoalcohol or carboxylic acid, form, it/they can be removed from the reaction mixture by distillation thereby helping to drive the reaction to completion. If desired, transesterification can be catalyzed with such transesterification catalysts as strong protic acids having pK$_a$'s below 5.0, strong bases having pK$_b$'s below 5.0 and transition metal complexes such as complexes of tin, iron, titanium and/or other metals. These and other suitable catalysts are disclosed in, e.g., "The Siloxane Bond, Physical Properties and Chemical Transformations", M. G. Voronkov, V. P. Mileshkevich and Yu, A. Yuzhelevskii, Consultants Bureau, a division of Plenum Publishing Company, New York (1978), Chapter 5, the entire contents of which are incorporated by reference herein. The acid, base or metal catalysts can generally be used at a level of from 10 ppm to 2 weight percent, preferably from 20 to 1000 ppm, and more preferably from 100 to 500 ppm based on the total starting weight of the hydroxyl-containing hydrolyzable silane.

Oligomers derived from the hydrolysis and subsequent condensation of a hydroxyl-containing hydrolyzable silane of Formula (1) can be prepared by adding water or a carboxylic acid such as formic acid to the silane. The amount of water reacted can range from 0.1 to 99.9, preferably from 1 to 99, more preferably from 5 to 95, and most preferably from 10 to 20, weight percent water based upon the total weight of the reaction composition. The reaction can be carried out within a temperature of from 0 to 150° C., preferably from 25 to 100° C. and more preferably from 60 to 80° C., while maintaining a pressure of from 0.1 to 2000 mm Hg absolute. As the lower boiling $R^1O$—H group, such as monoalcohol or carboxylic acid, forms, it can be removed from the reaction mixture by distillation thereby helping to drive the reactions to completion. The reactions can optionally be catalyzed using a hydrolysis and condensation catalyst suitable ones of which are strong protic acids whose $pK_a$'s are below 5.0, strong bases whose $pK_b$'s are below 5.0, transition metal complexes such as complexes of tin, iron, titanium and other metal catalysts. These catalysts are disclosed in, "The Siloxane Bond, Physical Properties and Chemical Transformations", M. G. Voronkov, V. P. Mileshkevich and Yu. A. Yuzhelevskii, Consultants Bureau, a division of Plenum Publishing Company, New York (1978), Chapter 5 and is incorporated by reference herein in its entirety. The acid, base or metal catalysts can be used in amounts ranging from 10 ppm to 2 weight percent, preferably from 20 to 1000 ppm, and more preferably from 100 to 500 ppm based on the total combined weight of the hydroxyl-containing hydrolyzable silane and water.

The oligomers herein can also be prepared using the ion exchange resins and reaction conditions described in U.S. Pat. No. 6,391,999, the entire contents of which are incorporated by reference herein.

In another specific embodiment, each $R^1O$— moiety in the hydrolyzable silyl group of the silane is independently the same or different moiety such as alkyloxy, acyloxy, alkoxyalkyloxy, alkoxyaryloxy, acyloxyalkyloxy, acyloxyaryloxy and aryloxy. Examples of $R^1O$— moieties are methoxy, ethoxy, propoxy, isopropoxy, 1-{2-[2-(2-methoxy-ethoxy)-ethoxy]-ethoxy}-propoxy, and the like.

In yet another specific embodiment herein, each $R^3$, $R^4$, $R^6$ and $R^8$ group is a linear, branched or cyclic alkylene group of from 1 to 12 carbon atoms, preferably from 2 to 8 carbon atoms, and more preferably from 3 to 6 carbon atoms. Examples of such groups are methylene, ethylene, propylene, isopropylene, butylene, isobutylene, pentylene, isopentylene, hexylene, isohexylene, and the like.

In still another specific embodiment herein, each $R^1$ and $R^2$ group is an alkyl group of from 1 to 4 carbon atoms; each $R^3$, $R^4$, $R^5$ and $R^8$ group is a linear alkylene group of from 1 to 12 carbon atoms, preferably from 2 to 8 carbon atoms, and more preferably from 3 to 6 carbon atoms; each $R^6$ is independently hydrogen, a linear alkyl group of from 1 to 4 carbon atoms, an —$R^5(OH)_d$ group or a —$C(=O)A^1R^5(OH)_d$ group, wherein each $R^5$, $R^8$ and d is defined as above, $A^1$ is —$NR^9$— wherein $R^9$ is hydrogen; and, $R^7$ is independently hydrogen, a linear alkyl group of from 1 to 4 carbon atoms or an —$R^8(OH)_f$ group.

In yet another embodiment, $A^1$ is —O— or —$NR^9$— wherein $R^9$ is hydrogen, an alkyl group of from 1 to 4 carbon atoms or an —$R^5(OH)_d$ group wherein $R^5$ is an alkylene group of from 1 to 6 carbon atoms, b is 0 or 1, c is 1, d is 1, and e is 1; preferably $A^1$ is —$NR^9$— wherein $R^9$ is hydrogen, an alkyl group of from 1 to 4 carbon atoms or an —$R^5(OH)_d$ group wherein $R^5$ is an alkylene group of from 1 to 6 carbon atoms, b is 0 or 1, c is 1, d is 1, and e is 1; and, more preferably $A^1$ is —$NR^9$— wherein $R^9$ is hydrogen or an —$R^5(OH)_d$ group, d is 1 and e is 1.

The hydroxyl-containing hydrolyzable silane of Formula (1) can possess one or more nitrogen-containing organofunctional groups. For example, one or more amino, ureido and/or carbamato groups can be present in the same silane such as when b is 1 to 20, e is 0 or 1 and $R^6$ is hydrogen or an —$C(=O)A^1R^5(OH)_d$ group wherein $A^1$ is —O— or —$NR^9$— and $R^9$ is hydrogen, a monovalent hydrocarbyl group of from 1 to 8 carbon atoms such as an alkyl, alkenyl, arenyl, aryl or aralkyl group, a —$R^3Si^2{}_a(OR^1)_{3-a}$ group or a —$R^8(OH)_f$ group wherein $R^1$, $R^2$, $R^3$, $R^8$, a and f have the forestated meanings.

It will be understood that the above-described hydroxyl-containing hydrolyzable silane can comprise neat hydroxy-containing silanes that can undergo intramolecular and/or intermolecular transesterification, e.g., in accordance with Equations (I) and (II), respectively:

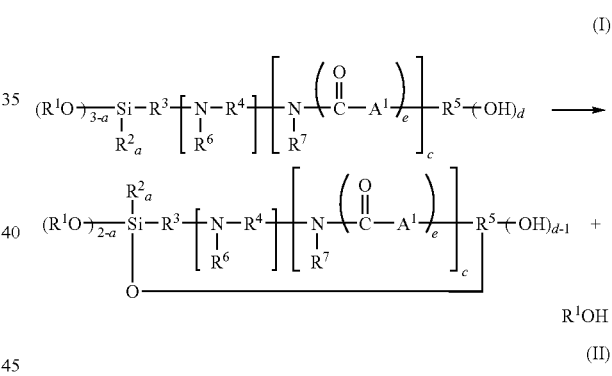

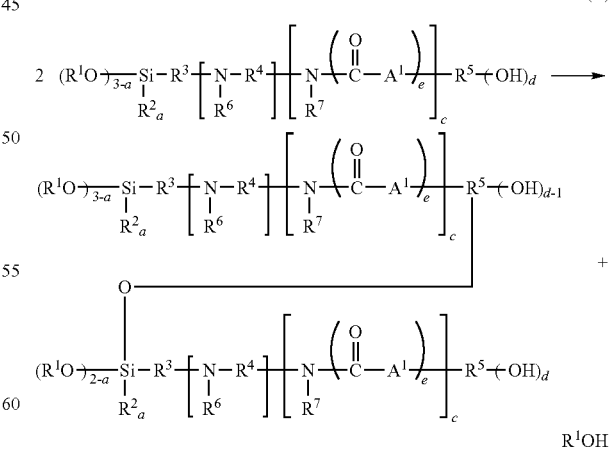

wherein $R^1$, $R^2$, $R^3$, $R^4$, $R^5$, $R^6$, $R^7$, $A^1$, a, b, c, d and e have the aforestated meanings. It will also be understood that one or more of the hydroxyl groups of the hydrolyzable silane can react intramolecularly and/or intermolecularly to form one or more cyclic structures and/or one or more bridging structures, as provided in Equation III:

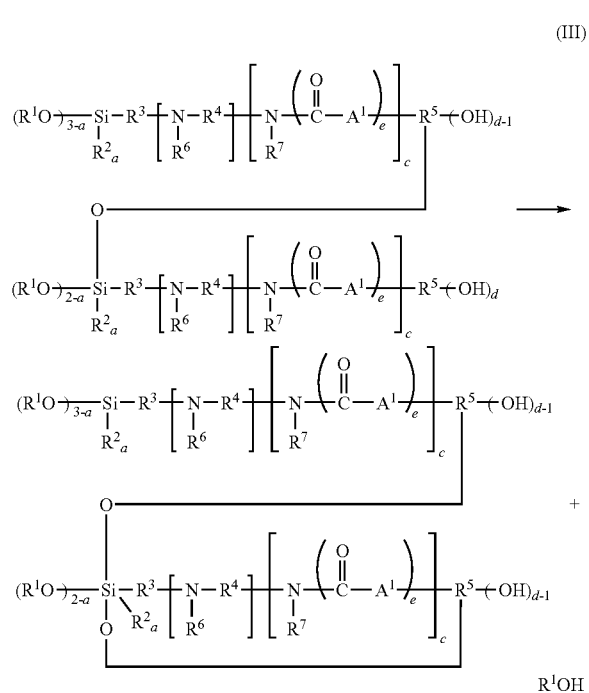

In another specific embodiment, intermolecular transesterification can lead to the formation of oligomers such as are described herein, resulting in the build up in molecular weight and viscosity of the hydroxyl-containing hydrolyzable silane(s). However, when hydrolyzed, such oligomers can break up into smaller molecules exhibiting lower viscosities and higher solubilities in aqueous media containing them.

In one specific embodiment herein, the hydroxyl-containing hydrolyzable silane is a silane containing at least one hydroxyl group and, optionally, at least one substituted nitrogen group, said silane being a derivative of at least one of an aminoalkoxysilane, ureidoalkoxysilane, epoxyalkoxysilane and haloalkoxysilane.

In another specific embodiment herein, the hydroxyl-containing hydrolyzable silane is a silane containing at least one hydroxyl group, the silane being a derivative of at least one of the following silanes:

3-bromopropyltrimethoxysilane, 2-chloroethylmethyldimethoxysilane, 4-aminobutyltriethoxysilane, N-(2-aminoethyl)-3-aminopropyltrimethoxysilane, N-(6-aminohexyl)aminopropyltrimethoxysilane, 3-aminopropyldimethylethoxysilane, 3-aminopropylmethyldiethoxysilane, 3-aminopropyltrimethoxysilane, 3-aminopropyltris(methoxyethoxy-ethoxy)silane, aminoisobutylmethyldimethoxysilane, gamma-aminopropyltriethoxysilane, bis-(gamma-trimethoxysilylpropyl)amine, N-2-(vinylbenzylamino)-ethyl-3-aminopropyltrimethoxysilane, N-beta-(amino ethyl)-gamma-aminopropyltriethoxysilane, aminomethyltriethoxysilane, aminomethyldiethoxysilane, gamma-aminoisobutyltrimethoxysilane, 4-aminobutyltrimethoxysilane, N-2-(aminoethyl)-3-aminopropyltris(2-ethylhexoxy)silane, 3-aminopropyldiisopropylethoxysilane, 3-N-methylaminopropyltriethoxysilane, 3-aminopropylphenyldiethoxysilane, 3,3'-aminobis(propyltriethoxysilane), N-(3-triethoxysilylpropyl)dibutyl aspartate, 3-aminopropylmethyldiethoxysilane, 4-ureidobutyltriethoxysilane, N-(2-ureidoethyl)-3-aminopropyltrimethoxysilane, N-(6-ureidohexyl)-3-ureidopropyltrimethoxysilane, 3-ureidopropyldimethylethoxysilane, 3-ureidopropylmethyldiethoxysilane, 3-ureidopropyltrimethoxysilane, 3-ureidopropyltris(methoxyethoxyethoxy)silane, ureidoisobutylmethyldimethoxysilane, 3-ureidopropyltriethoxysilane, N,N'-bis-(3-trimethoxysilylpropyl)urea, 3-glycidoxypropyltrimethoxysilane and combinations thereof.

Processes for making hydroxyl-containing hydrolyzable silanes of Formula (1) are known in the art, e.g., from U.S. Pat. Nos. 5,587,502 and 5,371,262, the entire contents of which are incorporated by reference herein.

In another specific embodiment herein, the hydroxyl-containing hydrolyzable silane is at least one of:
bis-(2-hydroxyethyl)aminopropyltriethoxysilane,
bis-(2-hydroxyethyl)aminopropyltrimethoxysilane,
hydroxyethylaminopropyltriethoxysilane,
N-(hydroxyethyl)-N-methylaminopropyltrimethoxysilane,
N-(hydroxyethyl)-N-methylaminopropyltriethoxysilane,
N-(hydroxyethyl)-N-butylaminopropyltrimethoxysilane,
N-(hydroxyethyl)-N-butylaminopropyltriethoxysilane,
bis-(hydroxypropyl)aminopropyltriethoxysilane,
bis-(hydroxypropyl)aminopropyltrimethoxysilane,
hydroxypropylaminopropyltriethoxysilane,
N-(hydroxypropyl)-N-methylaminopropyltrimethoxysilane,
N-(hydroxyproyl)-N-methylaminopropyltriethoxysilane,
N-(hydroxypropyl)-N-butylaminopropyltrimethoxysilane,
N-(hydroxypropyl)-N-butylaminopropyltriethoxysilane,
bis-(hydroxyethyl)aminopropylmethyldiethoxysilane,
bis-(2-hydroxyethyl)aminopropylmethyldimethoxysilane,
hydroxyethylaminopropylmethyldiethoxysilane,
N-(hydroxyethyl)-N-methylaminopropylmethyldimethoxysilane,
N-(hydroxyethyl)-N-methylaminopropylmethyldiethoxysilane,
N-(hydroxyethyl)-N-butylaminopropylmethyldimethoxysilane,
N-(hydroxyethyl)-N-butylaminopropylmethyldiethoxysilane,
bis-(hydroxypropyl)aminopropylmethyldiethoxysilane,
bis-(hydroxypropyl)aminopropylmethyldimethoxysilane,
hydroxypropyl-3-aminopropylmethyldiethoxysilane,
N-(hydroxypropyl)-N-methylaminopropylmethyldimethoxysilane,
N-(hydroxyproyl)-N-methylaminopropylmethyldiethoxysilane,
N-(hydroxypropyl)-N-butyl-3-aminopropylmethyldimethoxysilane,
N-(hydroxypropyl)-N-butyl-3-aminopropylmethyldiethoxysilane,
N-(hydroxylethyl)-N-ethyl-3-amino-isobutyltrimethoxysilane,
N-(hydroxylethyl)-N-ethyl-3-amino-isobutyl-triethoxysilane,
N-(hydroxylethyl)-N-ethyl-3-amino-isobutylmethyldimethoxysilane,
N-(hydroxylethyl)-N-ethyl-3-amino-isobutylmethyldiethoxysilane,
bis(2-hydroxyethyl)-4-amino-3,3-dimethylbutyltrimethoxysilane,
bis-(2-hydroxyethyl)-4-amino-3,3-dimethylbutyltriethoxysilane, bis-(hydroxypropyl)-4-amino-3,3-dimethylbutyltrimethoxysilane,
bis-(hydroxypropyl)-4-amino-3,3-dimethylbutyltriethoxysilane,
bis-(2-hydroxyethyl)-4-amino-3,3-dimethylbutylmthyldimethoxysilane,
bis-(2-hydroxyethyl)-4-amino-3,3-dimethylbutylmethyldiethoxysilane,
bis-(hydroxypropyl)-4-amino-3,3-dimethylbutylmethyldimethoxysilane,
bis-(hydroxypropyl)-4-amino-3,3-dimethylbutylmethyldiethoxysilane,
2-hydroxyethyl-4-amino-3,3-dimethylbutyltrimethoxysilane,
2-hydroxyethyl-4-amino-3,3-dimethylbutyltriethoxysilane,
hydroxypropyl-4-amino-3,3-dimethylbutyltrimethoxysilane,
hydroxypropyl-4-amino-3,3-dimethylbutyltriethoxysilane,
2-hydroxyethyl-4-amino-3,3-dimethylbutylmthyldimethoxysilane,
2-hydroxyethyl-4-amino-3,3-dimethylbutylmethyldiethoxysilane,
hydroxypropyl-4-amino-3,3-dimethylbutylmethyldimethoxysilane,
hydroxypropyl-4-amino-3,3-dimethylbutylmethyldiethoxysilane,
hydroxymethyltrimethoxysilane, hydroxymethyltriethoxysilane,
(N-3-trimethoxysilylpropyl-N',N'-bis(2-hydroxyethyl)urea),
N-3-triethoxysilylpropyl-N',N'-bis(2-hydroxyethyl)urea,
N-(3-trimethoxysilanyl-propyl)-carbamic acid 2-hydroxyethyl ester, and,
[2-(2-trimethoxysilanyl-ethylamino)-ethyl]-carbamic acid 2-hydroxy-ethyl ester.

Oligomer(s) of the silane(s) of Formula I can be obtained by hydrolysis and subsequent condensation of a mixture of silanes containing at least one hydroxyl-containing hydrolyzable silane of Formula I and at least one hydrolyzable silane devoid of hydroxyl functionality. The amounts of hydroxyl-containing hydrolyzable silane of Formula (1) in the mixture ranges from 5 to 99, preferable from 10 to 95 and more preferable from 50 to 90, weight percent based on the combined weights of the hydroxyl-containing hydrolyzable silane of Formula (1) and the hydrolyzable silane devoid of hydroxyl functionality. The amounts of hydrolyzable silane devoid of hydroxyl functionality in the mixture ranges from 1 to 95, preferable from 5 to 90 and more preferable from 10 to 50, weight percent based on the combined weights of the hydroxyl-containing hydrolyzable silane of Formula (1) and the hydrolyzable silane devoid of hydroxyl functionality. Examples of the latter include, e.g., vinyl alkoxysilanes, allylalkoxysilanes, sulfur-containing alkoxysilanes, tetraalkoxysilanes, alkyl alkoxysilanes, haloalkyl alkoxysilanes, aryl alkoxysilanes, alkaryl alkoxysilanes, aralkyl alkoxysilanes, acryloyl and methacryloyl alkoxysilanes, mercaptoalkoxysilanes and aminoalkoxysilanes. Some specific silanes lacking hydroxyl functionality are tetraethoxysilane, tetramethoxysilane, tetraisopropoxysilane, methyltrimethoxysilane, ethyltriethoxysilane, hexyltriethoxysilane, cyclohexyltrimethoxysilane, 1,1,1-trifluoroethyltriethoxysilane, phenyltriethoxysilane, phenylmethyldiethoxysilane, phenylmethyldimethoxysilane, diphenyldimethoxysilane, 2-phenylethyltrimethoxysilane, benzyltriethoxysilane, vinyltrimethoxysilane, dimethyldimethoxysilane, trimethylmethoxysilane, diethyldimethoxysilane, allyltrimethoxysilane, divinyldimethoxysilane, methylinyldimethoxysilane, bis(triethoxysilyl)methane, bis(triethoxysilyl)ethane, butenyltrimethoxysilane, 3-bromopropyltrimethoxysilane, 2-chloroethylmethyldimethoxysilane, phenyltrimethoxysilane, 1,2-bis-(trimethoxysilyl)ethane, 1,6-bis-(trialkoxysilyl)hexane, 1,6-bis-(trimethoxysilyl)hexane, 1,2-bis-(triethoxysilyl)ethylene, 1,4-bis-(trimethoxysilylethyl)benzene, and 1,2-bis-(trimethoxysilylpropyl)amine, 4-aminobutyltriethoxysilane, N-(2-aminoethyl)-3-aminopropyltrimethoxysilane, N-(6-aminohexyl)aminopropyltrimethoxysilane, 3-aminopropyldimethylethoxysilane, 3-aminopropylmethyldiethoxysilane, 3-aminopropyltriethoxysilane, 3-aminopropyltrimethoxysilane, 3-aminopropyltris(methoxyethoxy-ethoxy)silane, aminoisobutyltrimethoxysilane, aminoisobutylmethyldimethoxysilane, gamma-aminopropyltriethoxysilane, bis-(gamma-trimethoxysilylpropyl) amine, vinyltriethoxysilane, vinyltripropoxysilane, vinyltriisopropoxysilane, vinyltributoxysilane, vinylacetoxysilane, vinylmethyltrimethoxysilane, vinylethylltrimethoxysilane, vinylpropyltrimethoxysilane, N-2-(vinylbenzylamino)-ethyl-3-aminopropyltrimethoxysilane, N-beta-(amino ethyl)-gamma-aminopropyltriethoxysilane, aminomethyltriethoxysilane, aminomethyldiethoxysilane, gamma-aminoisobutyltrimethoxysilane, methacryloxypropylmethoxysilane, vinyl-tris(2-methoxyethoxy)silane, mercaptopropyl silane, aminoalkoxy silane, 4-aminobutyltriethoxysilane, N-2-(aminoethyl)-3-aminopropyltris(2-ethylhexoxy)silane, 3-aminopropyldiisopropylethoxysilane, 3-N-methylaminopropyltriethoxysilane, 3-aminopropylphenyldiethoxysilane, 3,3'-aminobis(propyltriethoxysilane), N-(3-triethoxysilylpropyl)dibutyl aspartate and 3-aminopropylmethyldiethoxysilane.

The amount of hydroxyl-containing hydrolyzable silane present in the aqueous solution employed in the metal coating method of the invention can vary considerably depending on the amount and/or type of monomers, oligomers and/or partially condensed oligomers present therein, the amount and/or type of water and the amount and/or type of any additional component(s) such as surfactant, catalyst, cosolvent, organic acid, etc. The amount of hydroxyl-containing hydrolyzable silane can also vary based upon the desired levels of surface tension, pH, stability and hydrolysis of the silane.

Suitable amounts of silane include, e.g., from 0.01 to 50, preferably from 0.1 to 30, and more preferably from 0.5 to 16, weight percent based on the total weight of the aqueous composition. Concentrations of silane significantly greater than 50 weight percent may result in a relatively thick (referring to thickness in mass per square area) metal coating. Such coatings are generally more costly to manufacture and can be brittle and therefore not very practical. In addition, thick coatings may also reduce the micro-roughness of the metal to which they are applied which decreases the surface area of the metal and may lead to less interaction between the adhesion promoting coating and any further applied thereto. In general, the coating composition of the invention can have a dry thickness of from 0.01 to 5, preferably from 0.05 to 2, and more preferably from 0.1 to 1, micrometers.

In one embodiment herein, the hydroxyl-containing hydrolyzable silane can have a relatively high solubility in aqueous media even up to being fully miscible with a selected aqueous composition. Some advantageous solubilities include up to 600 grams per liter (g/l), preferably up to 400 g/l and more preferably up to 300 g/l. In another specific embodiment herein, the hydroxyl-containing hydrolyzable silane can be made to possess long-term stability despite thermodynamically favorable condensation processes. In yet a further specific embodiment, oligomers of the silane can exhibit one of the above-described levels of high solubility.

The aqueous solution of the hydroxyl-containing hydrolyzable silane can be partially or substantially fully hydrolyzed and the resulting hydrolysis products can subsequently partially condense to form oligomers through the formation of siloxane bonds (Si—O—Si). These partially condensed products are generally less soluble in water. If the extent of condensation becomes too great, the oligomers or a significant portion of them may become insoluble and as such, unsuitable for use in the metal coating method of the invention.

The extent of condensation can be determined by the $^{29}$Si Nuclear Magnetic Resonance procedure described above using Equation (II):

$$\text{Percent condensation} = [100\%][C/(A+B+C)] \quad \text{(II)}$$

wherein A is the number of hydrolyzable silyl groups, B is the number of silanol groups and C is the number of silyloxy groups that have replaced an alkoxy or hydroxy group.

Useful aqueous coating media generally possesses a level of condensation of the hydroxyl-containing hydrolyzable silane component(s) of from 0 to 95, preferably from 1 to 80, and more preferably from 2 to 50, percent.

The aqueous coating composition of the invention can optionally include at least one surfactant such as a polyoxyethylene alkyl ether, polyoxyethylene alkyl phenyl ether, polyoxyethylene fatty acid ester, sorbitan fatty acid ester, polyoxyethylene sorbitan fatty acid ester fatty acid salt, alkyl sulfate ester salt, alkyl benzene sulfonate, alkyl phosphate, alkylallyl sulfate ester salt, polyoxyethylene alkylphosphate ester, quaternary ammonium salt, long chain alkyl trimethylammonium salt, long chain alkyl benzyl dimethyl ammonium salt, di(long chain alkyl)dimethyl ammonium salt, ethoxylated nonyl phenol, polyvinyl alcohol, etc. Specific examples of suitable surfactants include Triton X-100 manufactured by Dow Chemical Company and Silwet* L-77 manufactured by Momentive Performance Materials (provided in the case of the latter, the surfactant is present at a neutral pH). The amount of surfactant employed can vary greatly depending on the amount and/or type of hydroxyl-functional carbamoyl organosilicon compound, the amount and/or type of water and the amount and/or type of additional component(s) utilized such as catalyst, cosolvent and organic acid. The amount of surfactant can also vary depending on the desired levels of surface tension, pH, stability and hydrolysis of the silane component(s) of the coating composition. Suitable amounts of surfactant where present, are from 0.0001 to 5, preferably from 0.001 to 2, and more preferably from 0.02 to 0.1, weight percent based on the total weight of the aqueous coating composition.

The stability of an aqueous coating composition herein can often be enhanced by the addition thereto of an organic cosolvent, preferably one which is a non-VOC, non-HAP, e.g., an alcohol such as 3-{2-[2-(2-methoxy-ethoxy)-ethoxy]-ethoxy}-propan-1-ol or 3-[2-(2-butoxy-propoxy)-propoxy]-propan-1-ol, a ketone such as acetone or methyl ethyl ketone, a glycol such as hexylene glycol or 2-methyl-1,3-butanediol, an ester such as acetic acid 3-[2-(2-butoxy-propoxy)-propoxy]-propyl ester, and the like. The amount of cosolvent utilized can vary over fairly wide limits depending on the amount and/or type of hydroxyl-containing hydrolyzable silane component(s), the amount and/or type of oligomers and/or partial condensates derived therefrom, the amount and/or types of water, the amount and/or type of any optional component(s) such as surfactant, catalyst and organic acid, and the desired levels of surface tension, stability and hydrolysis of the silane component(s). Thus, e.g., the amount of cosolvent can range from 0.1 to 50, preferably from 0.5 to 30, and more preferably from 1 to 20, weight percent based on the total weight of aqueous coating composition. When the hydroxyl-containing hydrolyzable silane is hydrolyzed, a moderate amount of alcohol by-product(s) may be produced which may be sufficient to increase the stability of the hydrolyzed product(s) without the separate addition of another cosolvent. Such alcohol by-product(s) can represent from 0.1 to 50, preferably from 0.1 to 20, and more preferably from 0.2 to 6, weight percent of the total weight of the aqueous coating composition.

The pH of the aqueous coating composition is advantageously controlled so as to minimize the rate of condensation of its silane component(s) and as a result, maximize the stability of the aqueous coating medium comprising the hydroxyl-containing hydrolyzable silane component(s). The aqueous coating composition can exhibit a stability of at least 3, preferably at least 4, more preferably at least 5, and most preferably at least 6, months under ambient temperature conditions. Optimization of the stability of the aqueous coating composition over time can be furthered by the addition thereto of a pH modifier to provide a pH of, e.g., from 2 to 9, preferably from 3 to 8, more preferably from 3 to 7, and most preferably from 3.5 to 6. Among some suitable pH modifiers are included acetic acid, formic acid, citric acid and phosphoric acid. The pH modifier can also react with the optional amino group of the hydroxyl-containing hydrolyzable silane to form a salt. The salt has higher solubility and better stability in the aqueous medium. These and similar pH modifiers can be present at, e.g., from 0.001 to 2, preferably from 0.001 to 1, and more preferably from 0.01 to 0.2, weight percent based on the total weight of the aqueous coating composition.

In another specific embodiment herein, the above described organic acids can be used to assist in the hydrolysis of hydrolyzable groups on the silane within one of the above-describe pH ranges.

If desired, a catalyst can be used to promote condensation during curing of the coating. Suitable catalysts for this purpose include tin catalysts such as dibutyltin dilaurate, dibutyltin diacetate, dibutylylin maleate, dilauryltin diacetate, dioctyltin diacetate, dibutyltin-bis(4-methylaminobenzoate), dibuyltindilauryl mercaptide and dibutyltin-bis(6-methylaminocaproate). The condensation catalyst may reduce the shelf life of the anti-corrosion and/or adhesion promoting coating. Preferably, latent catalysts are used. Latent catalysts are inactive during storage and are activated by heat, radiation, or evaporation during the curing process. Examples include salts formed from gaseous or high vapor pressure organic bases, e.g., vapor pressures of 20-760 mmHg at atmospheric pressure, such as ammonia or amine, and low vapor pressure carboxylic acids, e.g., vapor pressures below 1 mmHg, such as phthalatic acid. The amount of condensation catalyst can vary widely, e.g., from 0.001 to 1, preferably from 0.001 to 0.5, and more preferably from 0.01 to 0.2, weight percent based on the total weight of the anti-corrosion and/or adhesion promoting coating composition.

The method of applying the aqueous coating composition of the invention comprises applying the coating composition to a desired metal surface, curing the composition on said surface and, optionally, applying another coating, e.g., a paint, to the cured coating. The hydroxyl groups of the cured coating derived from the hydroxyl-containing hydrolyzable silane can interact with the further other coating, e.g., through the formation of hydrogen bonds or covalent bonds. The term "paint" will be understood herein to refer to all coatings, other than the silane-containing coating described herein, such as epoxies, enamels, latexes, primers, basecoats, clearcoats, lacquers, varnishes, shellacs, polyurethane finishes, etc., which are used to protect and/or beautify substrates. A paint that is particularly useful herein as a secondary coating is a polyester based paint such as Permaclad 2400 available from Sherwin Williams. The extent of creepage (a measure of anti-corrosion performance of a coating) can vary greatly based upon such factors as the specific paint used, exposure time, nature of the underlying silane-based coating and other factors familiar to those skilled in the art. Besides paint, other compositions that can be applied to the cured anti-corrosion and/or adhesion promoting coating composition herein include rubbers, adhesives, sealants, plastics, hard coats, and the like.

The metal can be provided in the form of a sheet, bar, rod, wire, foil, etc. Suitable metals include copper, silver, brass, titanium, titanium alloy, gold, tin, nickel, chromium, tantalum, iron, surface cold-rolled steel, galvanized steel, hot dip galvanized steel, prime steel, steel coated with at least one of zinc, zinc alloy, aluminum, aluminum alloy, etc. and aluminum.

The aqueous coating composition of the invention can be applied to a metal surface by any known or conventional procedure, e.g., roll-coating, specifically reverse roll coating, dip-coating, flood coating, spray and drawdown technique, and the like.

The anti-corrosion and/or adhesion promoting coating compositions are cured by removal of the water phase. The curing process can be carried out at a temperature ranging from 15 to 150° C., preferably from 20° C. to 50° C. and more preferably from 25° C. to 30° C., while maintaining a pressure in the range of from 0.1 to 2000 mm Hg absolute. The heat can be provided using an oven, such as a convection oven, or heat lamps. In another embodiment, the temperature can range from 20° C. to 50° C. while maintaining a pressure in the range of from 1 to 80 mm Hg absolute. Passing a stream of air over the surface of the metal substrate containing the anti-corrosion and/or adhesion promoting coating, where the air has a velocity ranging specifically from 0.1 to 25 meters/hour and more specifically from 1 to 15 meters/hour, will aid in the evaporation of the water and the curing process.

After application to the metal surface, the silane component(s) of the coating composition can react with metal hydroxyl groups, if present on the metal surface, to form covalent bonds anchoring the silane(s) to the metal surface. These covalent bonds thus may serve to significantly improve the adhesive bonding of the cured coating to the surface of the treated metal.

Curing of the silane component(s) of a freshly applied coating composition involves the reaction of a silanol of one silane molecule with the silanol of another silane molecule accompanied by the generation of water, and can optionally be incompletely cured. The percent condensation of the incompletely cured coating can range, e.g., from 30 to 100, preferably from 60 to 99, and more preferably from 65 to 95, percent.

The adhesion of a further applied coating, e.g., a paint, may be improved if the condensation of the underlying silane-based layer is in the range of from 60 to 99, and preferably from 65 to 95, percent. Such improved adhesion may be due to the ability of the further applied coating to wet-out the less than completely condensed silane-based coating and to penetrate into, or swell, the underlying partially condensed coating. A partially condensed coating tends to be somewhat more polar and/or have a lower crosslink density because of the residual hydroxyl (HO—) and/or alkoxy ($R^1$O—) groups. These hydroxyl and/or alkoxy groups may enhance the wettability and swellability of the cured film.

The further applied coating can be applied to the cured silane base coating by any known convention procedures, e.g., roll coating, dip coating, flood coating, spray and drawdown techniques and the like. The dry film thickness of the further applied coating ranges from 0.1 to 100 micrometers, and preferably from 1 to 500 micrometers.

The examples presented below are illustrative of the invention.

The metal employed in the examples was provided in the form of unpolished, cut cold rolled steel (CRS) panels measuring 15.2 centimeters (cm)×10.16 cm×0.08128 cm supplied by ACT Laboratories. Prior to being coated, the test panels were cleaned with an alkaline cleaner in a conventional manner, rinsed with distilled water and blow-dried with nitrogen gas. The coating compositions were applied directly to the test panels by a very fine drawdown wire rod (size #3 from Gardco). The coated panels were dried vertically with excess coating being removed from each panel's bottom edge. The coatings on the panels were then cured and the cured coatings painted with white H67WC55 high solids polyester backing enamel (Permaclad 2400, Sherwin Williams) to a dry thickness of 1.2 mils. Each panel was then subjected to the ASTM B 117 accelerated corrosion test which involved exposing a panel to a neutral salt spray for 250 hours. The anti-corrosion performance of each panel was then evaluated according to ASTM D 1654. The adhesion performance of the coating compositions on the panels of the examples was compared with that of a chromium-sealed immersion zinc phosphate-treated control test panel. Specifically, this comparative evaluation consisted of dividing a scribe (metal panel) into 10 intervals of equal length. Due to uneven creepage along the scribe, the creepage was measured at the ends of those intervals. Creepage was reported as the minimum, maximum and average distance from the scribe in millimeters and is presented for each respective test panel in Table 1.

The chemical structures of the various silanes used in the examples are as follows:

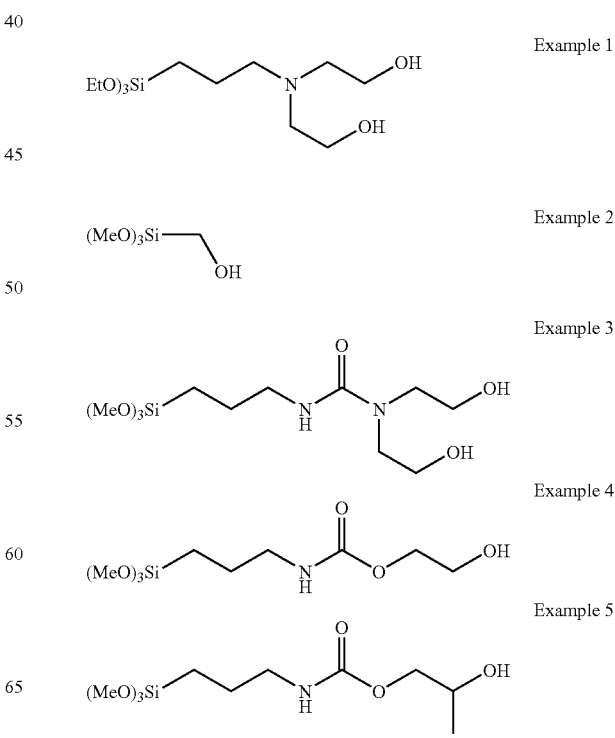

EXAMPLE 1

A solution of 62 wt. % $(EtO)_3Si(CH_2)_3N(CH_2CH_2OH)_2$ in ethanol was obtained from Gelest. An anti-corrosion and/or adhesion promoting coating of 2 wt. % bis-(hydroxyethyl) aminopropyltriethoxysilane was prepared by mixing 50 mg of non-ionic surfactant (Triton X-100), 1.61 g of said 62 wt % solution, and 46.72 grams of distilled water. Two treated panels, A and B, were cured at 120° C. for 20 minutes prior to being painted. Creepage of the paint on the coated test panels was measured and compared to a conventionally treated control and is reported as minimum, maximum and average distance from the scribe in millimeters and is summarized in Table 1.

TABLE 1

| Panel Description | Creepage, mm | | |
|---|---|---|---|
| | Average | Minimum | Maximum |
| $(EtO)_3Si(CH_2)_3N(CH_2CH_2OH)_2$ (Panel A) | 0.8 | 0.3 | 2.0 |
| $(EtO)_3Si(CH_2)_3N(CH_2CH_2OH)_2$ (Panel B) | 0.9 | 0.3 | 2.5 |
| Chromium sealed zinc phosphate (Control) | 1.6 | 1.0 | 2.0 |

EXAMPLE 2

A solution of 50 wt. % $(EtO)_3SiCH_2OH$ in ethanol was obtained from Gelest. An anti-corrosion and/or adhesion promoting coating of 2 wt. % of hydroxymethyltriethoxysilane was prepared by mixing 50 mg of non-ionic surfactant (Triton X-100), 50 mg acetic acid, 2 g of said 50 wt. % silane solution in ethanol, and 47.9 g of distilled water. The resulting mixture was stirred for approximately 48 hours until a clear solution was obtained. One pair of treated panels, A and B, were cured at 120° C. for 20 minutes prior to being painted. A second pair of treated panels, A and B, were cured at room temperature prior to being painted. Creepage of the paint on the coated test panels was measured and compared to a conventionally treated control and is reported as minimum, maximum and average distance from the scribe in millimeters and is summarized in Table 2.

TABLE 2

| Panel Description | Curing Conditions | Creepage, mm | | |
|---|---|---|---|---|
| | | Average | Minimum | Maximum |
| $(EtO)_3SiCH_2OH$ (Panel A) | 20° C./1 hour | 0.8 | 0.3 | 3.0 |
| $(EtO)_3SiCH_2OH$ (Panel B) | 20° C./1 hour | 0.9 | 0.5 | 1.5 |
| $(EtO)_3SiCH_2OH$ (Panel A) | 120° C./20 min | 0.8 | 0.3 | 3.0 |
| $(EtO)_3SiCH_2OH$ (Panel B) | 120° C./20 min | 0.8 | 0.3 | 2.5 |
| Chromium sealed zinc phosphate (Control) | N/A | 1.9 | 1.5 | 2.5 |

EXAMPLE 3

$(MeO)3Si(CH2)3NHCON(CH2CH2OH)2$ was synthesized by slowly adding 5.12 g (48.71 mmol) of diethanolamine to 10 g (48.71 mmol) of 3-isocyanatopropyltrimethoxysilane under stirring. After said addition, the stirring continued for 1 hour. The product was then left standing and found to have gelled after several days. An anti-corrosion and/or adhesion promoting coating of 2 weight % of $(MeO)_3Si(CH_2)_3NHCON(CH_2CH_2OH)_2$ was prepared by mixing 50 mg of non-ionic surfactant (Triton X-100), 50 mg of acetic acid, 1 g of $(MeO)_3Si(CH_2)_3NHCON(CH_2CH_2OH)_2$ silane, 48.9 g of distilled water and, 0.335 g (15 wt. %) of colloidal cerium acetate. One pair of treated panels, A and B, was cured at 120° C. for 20 minutes prior to being painted. A second pair of treated panels, A and B, was cured at room temperature. Creepage of the paint on the coated test panels was measured and compared to a conventionally treated control and is reported as minimum, maximum and average distance from the scribe in millimeters and is summarized in Table 3.

TABLE 3

| Panel Description | Curing Conditions | Creepage, mm | | |
|---|---|---|---|---|
| | | Average | Minimum | Maximum |
| $(MeO)_3Si(CH_2)_3NHCON(CH_2CH_2OH)_2$ (Panel A) | 20° C./1 hour | 2.9 | 1.0 | 5.0 |
| $(MeO)_3Si(CH_2)_3NHCON(CH_2CH_2OH)_2$ (Panel B) | 20° C./1 hour | 2.1 | 1.3 | 2.5 |
| $(MeO)_3Si(CH_2)_3NHCON(CH_2CH_2OH)_2$ (Panel A) | 120° C./20 min | 1.8 | 0.5 | 5.0 |
| $(MeO)_3Si(CH_2)_3NHCON(CH_2CH_2OH)_2$ (Panel B) | 120° C./20 min | 1.1 | 1.0 | 1.5 |

EXAMPLE 4

3-Aminopropyltrimethoxysilane (20 g, 111.55 mmol) was mixed with propylene carbonate (11.39 g, 111.55 mmol) under slow stirring. The mixture became slightly warm. Stirring continued for 24 hours to give a silylurethane. Distilled water (18 g) was added drop-wise under stirring to a mixture of silylurethane (15 g), methanol (5 g), and acetic acid (0.1 g) to form a hazy solution. Stirring continued for 12 hours resulting in clear water-miscible liquid (39.37 wt. % of silane).

EXAMPLE 5

3-Aminopropyltrimethoxysilane (20 g, 111.55 mmol) was added to ethylene carbonate (9.82 g, 111.55 mmol). The mixture homogenized while stirred and then became slightly warm. Stirring continued for 24 hours to give a silylurethane compound. Distilled water (18 g) was added drop-wise under stirring to a mixture of silylurethane (15 g), methanol (5 g), and acetic acid (0.1 g) to form a hazy solution. Stirring continued for 12 hours resulting in clear water-miscible liquid (39.37 wt. % of silane).

EXAMPLE 6

An anti-corrosion and/or adhesion promoting coatings of 2.5 wt. % (MeO)$_3$Si(CH$_2$)$_3$NHCOOCH$_2$CH(Me)OH and (MeO)$_3$Si(CH$_2$)$_3$NHCOOCH$_2$CH$_2$OH silanes were prepared by adding 50 mg of a non-ionic surfactant (Triton X-100), 2.54 grams of a 39.37 wt. % aqueous solution of (MeO)$_3$Si(CH$_2$)$_3$NHCOOCH$_2$CH(Me)OH or (MeO)$_3$Si(CH$_2$)$_3$NHCOOCH$_2$CH$_2$OH and 47.41 grams of distilled water. Treated panels were dried for 20 minutes prior to being painted.

Due to uneven creepage along the scribe, the scribe was divided into 10 equal intervals and the creepage was measured at the ends of those intervals. The creepage is reported as minimum, maximum and average distance from the scribe in millimeters and summarized in Table 4.

TABLE 4

| Panel Description | Creepage, mm | | |
|---|---|---|---|
| | Average | Minimum | Maximum |
| (MeO)$_3$Si(CH$_2$)$_3$NHCOOCH$_2$CH(Me)OH (Panel A) | 0.9 | 0.5 | 1.5 |
| (MeO)$_3$Si(CH$_2$)$_3$NHCOOCH$_2$CH(Me)OH (Panel B) | 1.2 | 0.5 | 2.0 |
| (MeO)$_3$Si(CH$_2$)$_3$NHCOOCH$_2$CH$_2$OH (Panel A) | 1.2 | 0.5 | 1.5 |
| (MeO)$_3$Si(CH$_2$)$_3$NHCOOCH$_2$CH$_2$OH (Panel B) | 1.2 | 0.5 | 2.5 |
| Chromium sealed zinc phosphate (Control) | 2.0 | 1.5 | 2.5 |

In each example the aqueous hydroxyl functional silane adhesion promoting coating shows equal or better performance than the Zn—P—Cr control.

It will be understood that while the above description comprises many specifics, these specifics should not be construed as limitations, but merely as exemplifications of specific embodiments thereof. Those skilled in the art will envision many other embodiments within the scope and spirit of the description as defined by the claims appended hereto.

The invention claimed is:

1. A method of coating at least a portion of the exposed surface of a metal that does not contain a chromium sealed zinc phosphate coating, which comprises the steps:

a) applying to said surface a curable coating composition consisting essentially of:

(i) an aqueous solution of at least one partially or completely hydrolyzed and optionally partially condensed silane wherein the partially or completely hydrolyzed and optionally partially condensed silane is obtained from at least one hydrolyzable silane of the general Formula (1):

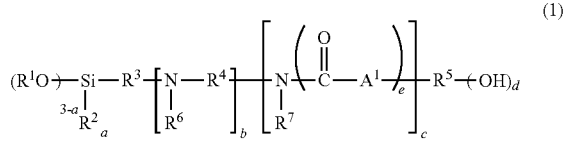

(1)

wherein:

each occurrence of R$^1$ and R$^2$ is independently a monovalent hydrocarbyl group of up to 20 carbon atoms, selected from an alkyl, alkenyl, arenyl, aryl, aralkyl and acyl group, optionally containing one or more etheric oxygen atoms;

each occurrence of R$^3$ and R$^4$ is independently a divalent hydrocarbylene group of up to 12 carbon atoms, selected from an alkylene, alkenylene, arenylene, arylene and aralkylene group;

each occurrence of R$^5$ is independently a divalent or polyvalent hydrocarbylene group of up to 12 carbon atoms, selected from an alkylene, alkenylene, arenylene, arylene and aralkylene group, provided, when b is 0, c is 0 and d is 1, then R$^5$ is a chemical bond between R$^3$ and the —OH group;

each occurrence of R$^6$ is independently hydrogen, a monovalent hydrocarbyl group of up to 8 carbon atoms, selected from an alkyl, alkenyl, arenyl, aryl or aralkyl group, an —R$^3$SiR$^2{}_a$(OR$^1$)$_{3-a}$ group, a —C(=O)A$^1$R$^5$(OH)$_d$ group and an —R$^5$(OH)$_d$ group;

each occurrence of R$^7$ is independently hydrogen, a monovalent hydrocarbyl group of up to 8 carbon atoms, selected from an alkyl, alkenyl, arenyl, aryl, and aralkyl group, an —R$^3$SiR$^2{}_a$(OR$^1$)$_{3-a}$ group and an —R$^8$(OH)$_f$ group;

each occurrence of A$^l$ is independently divalent oxygen (—O—) or nitrogen of the structure —NR$^9$— in which wherein R$^9$ is hydrogen, a monovalent hydrocarbyl group of up to 8 carbon atoms, selected from an alkyl, alkenyl, arenyl, aryl or aralkyl group, an —R$^3$SiR$^2{}_a$(OR$^1$)$_{3-a}$ group and an —R$^8$(OH)$_f$ group wherein each occurrence of R$^8$ is independently a divalent or polyvalent hydrocarbylene group selected from alkylene, alkenylene, arenylene, arylene and aralkylene groups of up to 12 carbon atoms; and, each occurrence of the subscripts a, b, c, d, e and f is independently an integer wherein a is 0 to 2; b is 0 to 20; c is 0 or 1; d is 1 to 4; e is 0 or 1; and, f is 1 to 4; and, (ii) at least one additional component selected from the group consisting of cosolvent, surfactant, a hydrolysable silane lacking a hydroxyl group and a pH modifier; and, b) curing the curable coating composition on the surface of the metal to provide an anti-corrosion coating thereon, wherein the curing step is carried out to provide an incompletely cured coating composition possessing a level of condensation of from 60 to 99 percent; and, c) applying a paint to the anti-corrosion coating of step (b) to provide for a metal surface coated therewith exhibiting at least 10 percent decrease in creepage value as measured by ASTM D 1654 compared with the similarly measured creepage value of a metal surface possessing a chromium sealed zinc phosphate coating of a thickness of 0.01 to 5 micrometers and the same paint of a thickness of 0.1 to 100 micrometers.

2. The method of claim 1 wherein each R$^1$O— group is independently a hydrolyzable alkyloxy, acyloxy, alkoxyalkyloxy, alkoxyaryloxy, acyloxyalkyloxy, acyloxyaryloxy or aryloxy group.

3. The method of claim 1 wherein each R$^3$ and R$^4$ group possesses from 1 to 12 carbon atoms and is independently a linear, branched or cyclic alkylene group.

4. The method of claim 1 wherein the partially or completely hydrolyzed and optionally partially condensed silane is obtained from at least one hydrolyzable silane selected from the group consisting of
bis-(2-hydroxyethyl)aminopropyltriethoxysilane,
bis-(2-hydroxyethyl)aminopropyltrimethoxysilane,
hydroxyethylaminopropyltriethoxysilane,
N-(hydroxyethyl)-N-methylaminopropyltrimethoxysilane,
N-(hydroxyethyl)-N-methylaminopropyltriethoxysilane,
N-(hydroxyethyl)-N-butylaminopropyltrimethoxysilane,
N-(hydroxyethyl)-N-butylaminopropyltriethoxysilane,
bis-(hydroxypropyl)aminopropyltriethoxysilane,
bis-(hydroxypropyl)aminopropyltrimethoxysilane,
hydroxypropylaminopropyltriethoxysilane,
N-(hydroxypropyl)-N-methylaminopropyltrimethoxysilane,
N-(hydroxyproyl)-N-methylaminopropyltriethoxysilane,
N-(hydroxypropyl)-N-butylaminopropyltrimethoxysilane,
N-(hydroxypropyl)-N-butylaminopropyltriethoxysilane,
bis-(hydroxyethyl)aminopropylmethyldiethoxysilane,
bis-(2-hydroxyethyl)aminopropylmethyldimethoxysilane,
hydroxyethylaminopropylmethyldiethoxysilane,
N-(hydroxyethyl)-N-methylaminopropylmethyldimethoxysilane,
N-(hydroxyethyl)-N-methylaminopropylmethyldiethoxysilane,
N-(hydroxyethyl)-N-butylaminopropylmethyldimethoxysilane,
N-(hydroxyethyl)-N-butylaminopropylmethyldiethoxysilane,
bis-(hydroxypropyl)aminopropylmethyldiethoxysilane,
bis-(hydroxypropyl)aminopropylmethyldimethoxysilane,
hydroxypropyl-3-aminopropylmethyldiethoxysilane,
N-(hydroxypropyl)-N-methylaminopropylmethyldimethoxysilane,
N-(hydroxyproyl)-N-methylaminopropylmethyldiethoxysilane,
N-(hydroxypropyl)-N-butyl-3-aminopropylmethyldimethoxysilane,
N-(hydroxypropyl)-N-butyl-3-aminopropylmethyldiethoxysilane,
N-(hydroxylethyl)-N-ethyl-3-amino-isobutyltrimethoxysilane,
N-(hydroxylethyl)-N-ethyl-3-amino-isobutyl-triethoxysilane,
N-(hydroxylethyl)-N-ethyl-3-amino-isobutylmethyldimethoxysilane,
N-(hydroxylethyl)-N-ethyl-3-amino-isobutylmethyldiethoxysilane,
bis(2-hydroxyethyl)-4-amino-3,3-dimethylbutyltrimethoxysilane,
bis-(2-hydroxyethyl)-4-amino-3,3-dimethylbutyltriethoxysilane,
bis-(hydroxypropyl)-4-amino-3,3-dimethylbutyltrimethoxysilane,
bis-(hydroxypropyl)-4-amino-3,3-dimethylbutyltriethoxysilane,
bis-(2-hydroxyethyl)-4-amino-3,3-dimethylbutylmthyldimethoxysilane,
bis-(2-hydroxyethyl)-4-amino-3,3-dimethylbutylmethyldiethoxysilane,
bis-(hydroxypropyl)-4-amino-3,3-dimethylbutylmethyldimethoxysilane,
bis-(hydroxypropyl)-4-amino-3,3-dimethylbutylmethyldiethoxysilane,
2-hydroxyethyl-4-amino-3,3-dimethylbutyltrimethoxysilane,
2-hydroxyethyl-4-amino-3,3-dimethylbutyltriethoxysilane,
hydroxypropyl-4-amino-3,3-dimethylbutyltrimethoxysilane,
hydroxypropyl-4-amino-3,3-dimethylbutyltriethoxysilane,
2-hydroxyethyl-4-amino-3,3-dimethylbutylmthyldimethoxysilane,
2-hydroxyethyl-4-amino-3,3-dimethylbutylmethyldiethoxysilane,
hydroxypropyl-4-amino-3,3-dimethylbutylmethyldimethoxysilane,
hydroxypropyl-4-amino-3,3-dimethylbutylmethyldiethoxysilane,
hydroxymethyltrimethoxysilane, hydroxymethyltriethoxysilane,
(N-3-trimethoxysilylpropyl-N',N'-bis(2-hydroxyethyl) urea),
N-3-triethoxysilylpropyl-N',N-bis(2-hydroxyethyl) urea,
N-(3-trimethoxysilanyl-propyl)-carbamic acid 2-hydroxyethyl ester and
[2-(2-trimethoxysilanyl-ethylamino)-ethyl]-carbamic acid 2-hydroxy-ethyl ester.

5. The method of claim 1 wherein the partially or completely hydrolyzed and optionally partially condensed silane is obtained from at least one hydrolyzable silane selected from the group consisting of aminoalkoxysilane, ureidoalkoxysilane, epoxyalkoxysilane and haloalkoxysilane.

6. The method of claim 1 wherein the partially or completely hydrolyzed and optionally partially condensed silane is obtained by hydrolysis of a mixture of hydrolyzable silanes at least one of which is a hydroxyl-containing hydrolyzable silane and at least one other of which is a hydrolyzable silane lacking a hydroxyl group.

7. The method of claim 1 wherein the partially or completely hydrolyzed and optionally partially condensed silane is obtained from a hydrolyzable silane having a solubility of up to full miscibility with water.

8. The method of claim 1 wherein the aqueous solution contains a cosolvent.

9. The method of claim 1 wherein curing step (b) is carried out to provide an underlying incompletely cured silane-based coating possessing a level of condensation of from 65 to 95 percent.

10. The method of claim 1 wherein at least one component of the paint possesses groups that form covalent bonds and/or hydrogen bonds with hydroxyl groups of silane-based component(s) of the underlying incompletely cured coating.

11. The method of claim 9 wherein at least one component of the paint possesses groups that form covalent bonds and/or hydrogen bonds with hydroxyl groups of silane-based component(s) of the underlying incompletely cured coating.

12. The method of claim 10 wherein the paint is selected from epoxies, enamels, latexes, primers, basecoats, clearcoats, lacquers, varnishes, shellacs and polyurethane finishes.

13. The method of claim 11 wherein the paint is selected from epoxies, enamels, latexes, primers, basecoats, clearcoats, lacquers, varnishes, shellacs and polyurethane finishes.

14. The method of claim 1 wherein the metal possesses a form selected from the group consisting of sheet, bar, rod, wire or foil, the metal being selected from the group consisting of copper, silver, brass, titanium, titanium alloy, gold, tin, nickel, chromium, tantalum, iron, surface cold-rolled steel, galvanized steel, hot dip galvanized steel, prime steel, steel coated with at least one of zinc, zinc alloy or aluminum, aluminum or aluminum alloy.

15. The method of claim 1 wherein the aqueous solution has a stability of at least 3 months.

16. The method of claim 1 wherein an amount of curable coating composition is applied to the metal surface so as to provide upon curing a coating thickness of from 0.01 to 5 micrometers.

17. The method of claim 1 wherein an amount of curable coating composition is applied to the metal surface so as to provide upon curing a coating thickness of from 0.1 to 1 micrometer.

18. The method of claim 1 wherein each $R^1$ and $R^2$ group is independently an alkyl group of from 1 to 4 carbon atoms; each $R^3$, $R^4$, $R^5$ and $R^8$ group is independently a linear alkylene group of from 3 to 6 carbon atoms; each $R^6$ group is independently hydrogen, a linear alkyl group of from 1 to 4 carbon atoms, an $-R^5(OH)_d$ group or a $-C(=O)A^1R^5(OH)_d$ group wherein d is 1 to 4, each $A^1$ is $-NR^9-$ wherein $R^9$ is hydrogen; and, each $R^7$ group is independently hydrogen, a linear alkyl group of from 1 to 4 carbon atoms or an $-R^8(OH)_f$ group.

19. The method of claim 1 wherein each $A^1$ is independently $-O-$ or $-NR^9-$ wherein $R^9$ is hydrogen, an alkyl group of from 1 to 4 carbon atoms or an $-R^5(OH)_d$ group wherein $R^5$ is an alkylene group of from 1 to 6 carbon atoms; and, b is 0 or 1, c is 1, d is 1, and e is 1.

20. The method of claim 1 wherein each $A^1$ is independently $-NR^9-$ wherein $R^9$ is hydrogen or an $-R^5(OH)_d$ group wherein $R^5$ is an alkylene group of from 1 to 6 carbon atoms; and, b is 0 or 1, c is 1, d is 1, and e is 1.

* * * * *